United States Patent
Itabashi et al.

(10) Patent No.: US 11,157,022 B2
(45) Date of Patent: Oct. 26, 2021

(54) FLIGHT CONTROL SYSTEM

(71) Applicant: SUBARU CORPORATION, Tokyo (JP)

(72) Inventors: Naoaki Itabashi, Tokyo (JP); Mitsuru Kono, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 182 days.

(21) Appl. No.: 16/240,125

(22) Filed: Jan. 4, 2019

(65) Prior Publication Data
US 2019/0278301 A1    Sep. 12, 2019

(30) Foreign Application Priority Data
Mar. 7, 2018   (JP) .............................. JP2018-040340

(51) Int. Cl.
G05D 1/10       (2006.01)
G08G 5/00       (2006.01)
B64C 39/02      (2006.01)

(52) U.S. Cl.
CPC ........... *G05D 1/101* (2013.01); *B64C 39/024* (2013.01); *G08G 5/0034* (2013.01);
(Continued)

(58) Field of Classification Search
CPC ...... G05D 1/101; G05D 1/106; G05D 1/1062; G05D 1/1064; B64C 39/024;
(Continued)

(56) References Cited

U.S. PATENT DOCUMENTS 9,542,849 B1 *  1/2017  Bertram ............... G08G 5/0086
2002/0161489 A1 * 10/2002 Johnson ............... G05D 1/0833
                                                        701/4
(Continued)

FOREIGN PATENT DOCUMENTS

JP      H07-271440 A    10/1995
JP      2018-97578 A    6/2018
(Continued)

OTHER PUBLICATIONS

Notice of Reasons for Refusal issued in corresponding Japanese Patent Application No. 2018-040340 dated Nov. 12, 2019, with machine translation.

Primary Examiner — Geepy Pe
Assistant Examiner — Kyle J Kingsland
(74) Attorney, Agent, or Firm — Troutman Pepper Hamilton Sanders LLP

(57) ABSTRACT

There is provided a flight control system including a virtual path setting unit, a first evaluation unit, a path determination unit, and a flight controller. The virtual path setting unit is configured to set a plurality of virtual paths other than a current path of an aircraft at a prescribed timing. The first evaluation unit is configured to evaluate envelope protection of each of the current path and the plurality of virtual paths. The path determination unit is configured to determine a path among the current path and the plurality of virtual paths, based on an evaluation result of the envelope protection. The flight controller is configured to control flight of the aircraft based on the determined path.

4 Claims, 3 Drawing Sheets

(52) U.S. Cl.
CPC ......... *G08G 5/0039* (2013.01); *G08G 5/0069* (2013.01); *B64C 2201/126* (2013.01); *B64C 2201/141* (2013.01)

(58) Field of Classification Search
CPC ........ B64C 2201/126; B64C 2201/141; G08G 5/0034; G08G 5/0039; G08G 5/0069
USPC ........................................................... 701/3
See application file for complete search history.

(56) References Cited

U.S. PATENT DOCUMENTS

| | | | |
|---|---|---|---|
| 2006/0235581 A1* | 10/2006 | Petillon | G08G 5/045 |
| | | | 701/3 |
| 2015/0142221 A1* | 5/2015 | Coulmeau | G08G 5/0034 |
| | | | 701/3 |
| 2015/0323930 A1 | 11/2015 | Downey et al. | |
| 2015/0336668 A1* | 11/2015 | Pasko | B64C 39/024 |
| | | | 701/2 |
| 2016/0232796 A1* | 8/2016 | Oldach | G08G 5/0013 |
| 2017/0254664 A1 | 9/2017 | Parekh et al. | |
| 2018/0286256 A1 | 10/2018 | Yoshifuku et al. | |
| 2019/0271563 A1* | 9/2019 | Pandit | G01C 21/20 |
| 2020/0242948 A1* | 7/2020 | Zeng | G08G 5/0034 |

FOREIGN PATENT DOCUMENTS

| | | |
|---|---|---|
| JP | 2018-165870 A | 10/2018 |
| WO | 2016/116739 A1 | 7/2016 |

\* cited by examiner

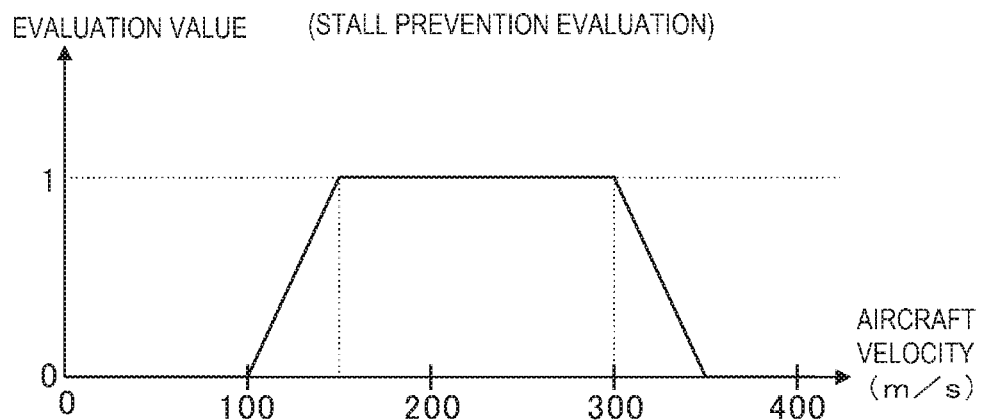
FIG. 5A (STALL PREVENTION EVALUATION)
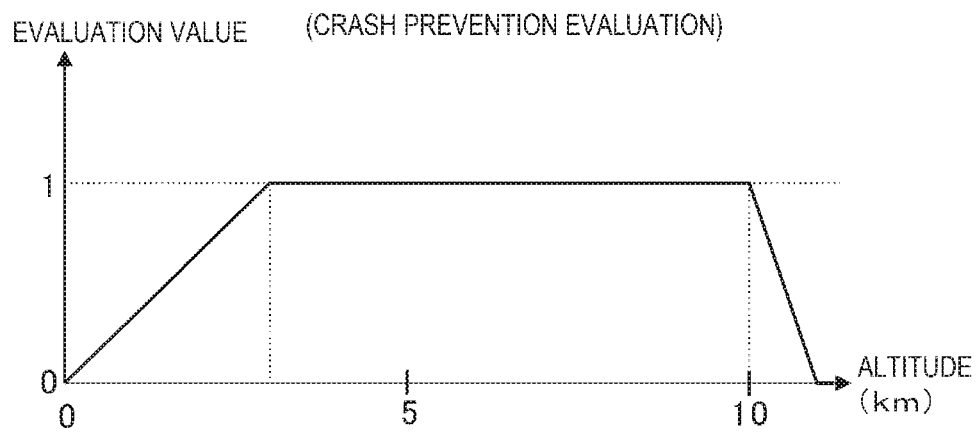
FIG. 5B (CRASH PREVENTION EVALUATION)
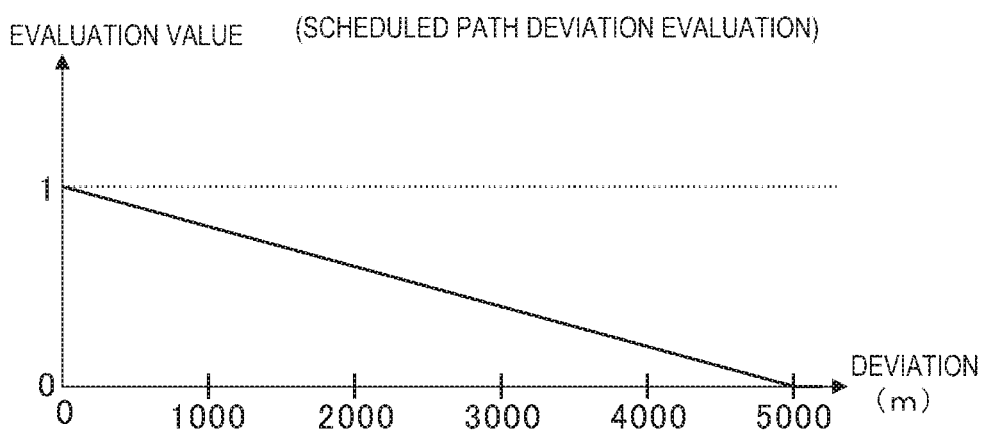
FIG. 6 (SCHEDULED PATH DEVIATION EVALUATION)

FLIGHT CONTROL SYSTEM

CROSS-REFERENCE TO RELATED APPLICATIONS

The present application claims priority from Japanese Patent Application No. 2018-040340 filed on Mar. 7, 2018, the entire contents of which are hereby incorporated by reference.

BACKGROUND

Technical Field

The present invention relates to a flight control system which controls flight of an aircraft.

Related Art

An unmanned aerial vehicle (unmanned aircraft) refers to an aircraft which flies in an unmanned state along a predetermined flight path without a pilot. There have been disclosed techniques for controlling pitch positions, roll positions, yaw positions and the like based on detection data of an airspeed, an altitude, and an atmospheric temperature of such an unmanned aircraft (for instance, Japanese Unexamined Patent Application Publication (JP-A) No. 07-271440).

SUMMARY OF THE INVENTION

An aspect of the present invention provides a flight control system including a virtual path setting unit configured to set a plurality of virtual paths other than a current path of an aircraft at a prescribed timing, a first evaluation unit configured to evaluate envelope protection of each of the current path and the plurality of virtual paths, a path determination unit configured to determine a path among the current path and the plurality of virtual paths, based on results of the envelope protection evaluations, and a flight controller configured to control flight of the aircraft based on the determined path.

An aspect of the present invention provides a flight control system including circuitry configured to set a plurality of virtual paths other than a current path of an aircraft at a prescribed timing, evaluate envelope protection of each of the current path and the plurality of virtual paths, determine a path among the current path and the plurality of virtual paths, based on results of the envelope protection evaluations, and control flight of the aircraft based on the determined path.

BRIEF DESCRIPTION OF THE DRAWINGS

FIGS. 5A and 5B are explanatory diagrams illustrating evaluations based on envelope protection.

FIG. 6 is an explanatory diagram illustrating an evaluation based on a mission achievement degree.

DETAILED DESCRIPTION

Hereinafter, examples of the present invention will be described in detail with reference to the accompanying drawings. The sizes, materials, other specific numerical values and the like shown in the examples are only instances for facilitating understanding the examples of the present invention, and are not intended to limit the examples of the present invention unless otherwise specified. In the specification and the drawings, elements having substantially the same functions and configurations will be denoted by the same symbols, duplicate descriptions thereon will be omitted, and drawings of elements which are not directly related to the examples of the present invention will be omitted.

An unmanned aircraft flies along a preset path (an instance of a scheduled path) on the basis of preset specifications. However, the unmanned aircraft might stall when the unmanned aircraft cannot follow the set scheduled path due to changes in the flight environment. In addition, when the precision of identifying undulations on the ground is low, the unmanned aircraft may contact with an unexpected obstacle. Further, in regions where other aircrafts which have no specified flight paths are flying, the unmanned aircraft might collide with such aircrafts.

It is desirable to provide a flight control system that selects an appropriate path while ensuring the flight safety of an aircraft.

Figure 1A:
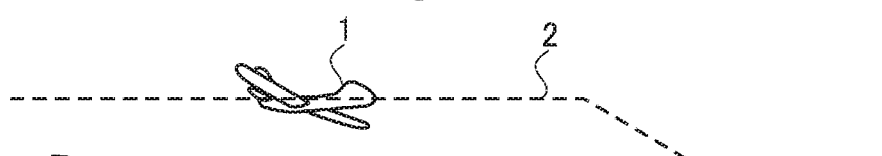
FIGS. 1A to 1C are explanatory diagrams illustrating flight modes of an aircraft.
Figure 1B:
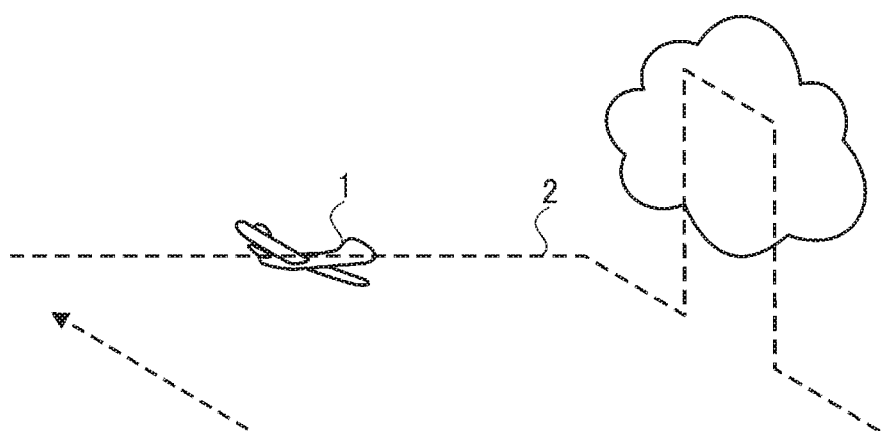
Figure 1C:
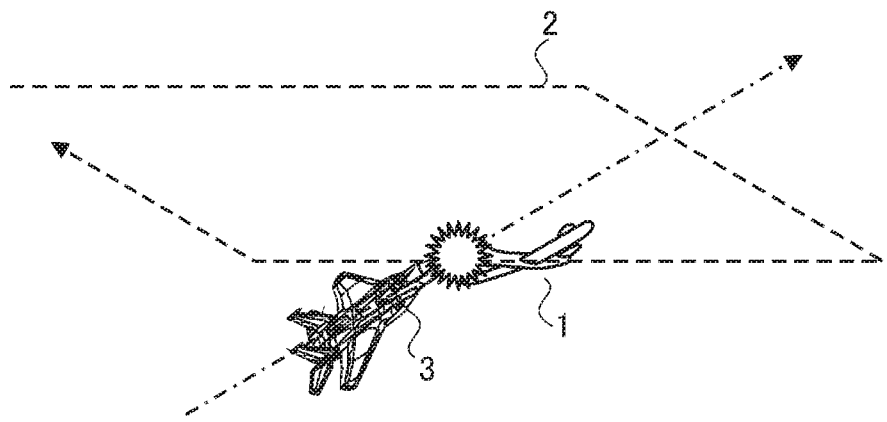

FIGS. 1A to 1C are explanatory diagrams illustrating flight modes of an aircraft. Here, an unmanned aircraft 1 which flies in an unmanned state along a prescribed flight path without a pilot will be exemplified as the aircraft. A scheduled path 2 illustrated in FIG. 1A and a flight mode (a flight position, an aircraft velocity, aircraft attitude, a nose direction, and the like) on the scheduled path 2 are preset for the unmanned aircraft 1 on the ground. Then, the unmanned aircraft 1 flies along the set scheduled path 2 in the set flight mode. Since no pilot gets on the unmanned aircraft 1, it is not necessary to consider the load of acceleration (G) applied to the pilot, and human lives are not lost even if an unexpected accident occurs.

However, since no pilot gets on the unmanned aircraft 1, the unmanned aircraft 1 might stall when the unmanned aircraft 1 cannot follow the set scheduled path 2 due to changes in the flight environment. For instance, even if the scheduled path 2 and the flight mode of the unmanned aircraft 1 are determined within an allowable range of the performance of the unmanned aircraft 1, the unmanned aircraft 1 might not have an adequate performance to follow an ascent command or a descent command during unexpected bad weather as illustrated in FIG. 1B, which results in an excessive velocity or an insufficient velocity.

Further, as illustrated in FIG. 1C, if there is another aircraft 3 whose flight path is not specified, a bird, or an unexpected obstacle, the unmanned aircraft 1 might contact (collide) with any of them. This example provides a flight control system that selects an appropriate path while ensuring the flight safety of the unmanned aircraft 1. Hereinafter, a configuration necessary for the flight control according to this example will be described. Description of configurations unrelated to this instance will be omitted.

(Flight Control System 10)

Figure 2:
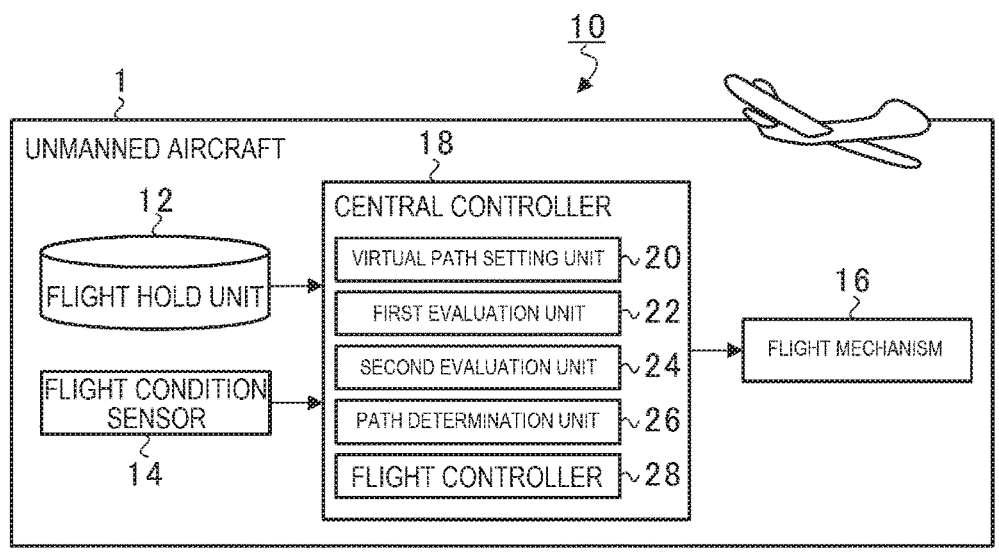
FIG. 2 is a functional block diagram illustrating a control system of an unmanned aircraft.

FIG. 2 is a functional block diagram illustrating a control system of the unmanned aircraft 1. The unmanned aircraft 1 includes a flight hold unit 12, a flight condition sensor 14, a flight mechanism 16, and a central controller 18.

The flight hold unit 12 stores various data necessary for the flight of the unmanned aircraft 1, such as the scheduled path 2 along which the unmanned aircraft 1 flies and flight data capable of specifying a flight mode at each flight position on the scheduled path 2.

The flight condition sensor 14 detects current flight conditions such as a flight position (including longitude, latitude, and altitude), an aircraft velocity, aircraft attitude, a wind force that the airframe receives, a wind direction, weather, an atmospheric pressure around the airframe, a temperature, and a humidity through various sensors such as a navigation sensor provided in the unmanned aircraft 1.

The flight mechanism 16 includes fixed wings fixed to the airframe, and an internal combustion engine (for instance, a jet engine or a reciprocating engine) that achieves a propulsive force. By generating a lift force around the wings by the propulsive force, the aircraft 1 keeps a floating state in the air. It should be noted that the mechanism that generates the lift force is not limited to this instance. The lift force or the propulsive force may be obtained by a rotor blade (rotor) provided rotatably.

The flight mechanism 16 may control a flight orientation (yaw angle), an altitude, and a flight velocity by adjusting a bank angle (rolling angle) and a nose angle (pitch angle) through an elevator or an auxiliary wing (aileron) and adjusting an output of the internal combustion engine.

The central controller 18 includes a semiconductor integrated circuit which includes a central processing unit (CPU), a ROM storing programs and the like, and a RAM serving as a work area. The central controller 18 manages and controls the entire unmanned aircraft 1. The central controller 18 also operates as a virtual path setting unit 20, a first evaluation unit 22, a second evaluation unit 24, a path determination unit 26, and a flight controller 28 which cooperate with the ROM and the RAM to serve as the flight control system 10. Hereinafter, a flight control process performed by the flight control system 10 will be described in detail based on the operation of each functional unit of the central controller 18.

(Flight Control Process)

Figure 3:
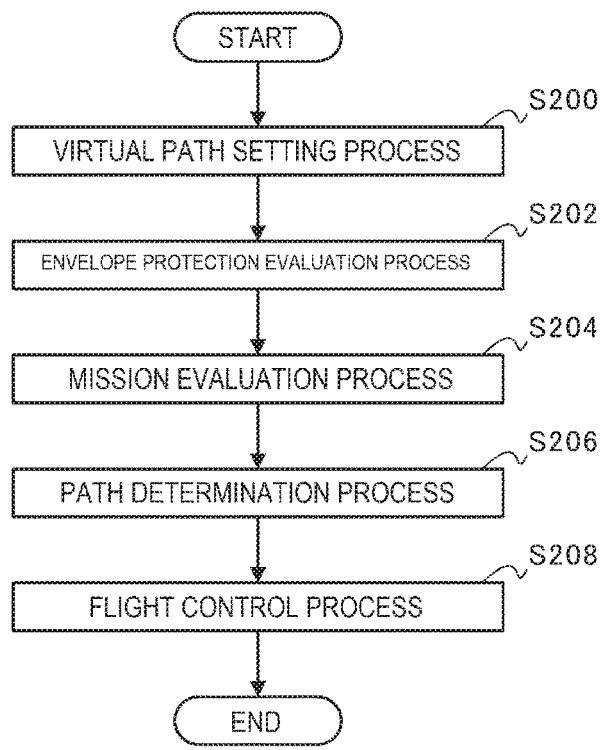
FIG. 3 is a flowchart of a flight control process.

FIG. 3 is a flowchart of the flight control process. Here, the flight control process is performed in accordance with interrupt signals generated every prescribed time (for instance, 0.5 second). In the flight control process, the virtual path setting unit 20 sets a plurality of virtual paths (S200). The first evaluation unit 22 evaluates envelope protection (S202). The second evaluation unit 24 evaluates a mission achievement degree (S204). The path determination unit 26 determines a path based on the evaluation results of the envelope protection and the mission achievement degree (S206). The flight controller 28 controls the flight of the unmanned aircraft 1 (S208).

(Virtual Path Setting Process S200)

The unmanned aircraft 1 is controlled so as to follow the scheduled path 2 set in advance, and flies along the prescribed path as a result of the control. Here, a path along which the unmanned aircraft 1 actually is flying, in contrast to the scheduled path 2, is referred to as a current path.

The virtual path setting unit 20 refers to the current path along which the unmanned aircraft 1 is flying at a prescribed timing, for instance, every prescribed time (for instance, 0.5 second), to set a plurality of virtual paths other than the current path.

Figure 4:
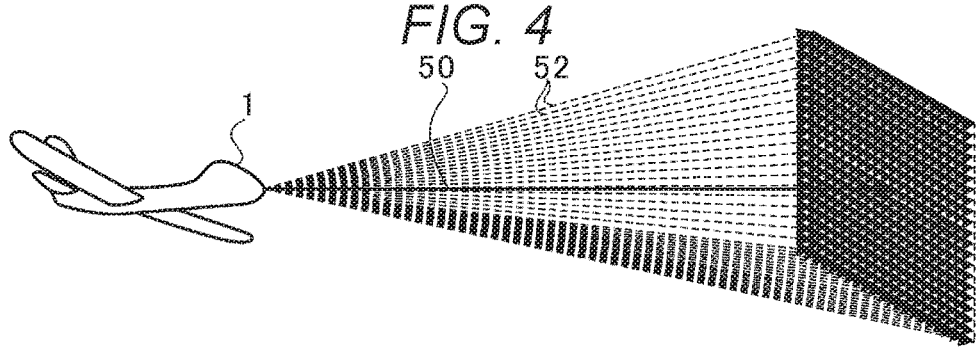
FIG. 4 is an explanatory diagram illustrating a plurality of virtual paths set by a virtual path setting unit.

FIG. 4 is an explanatory diagram illustrating the plurality of virtual paths set by the virtual path setting unit 20. Specifically, the virtual path setting unit 20 sets a range of ±10 degrees in a yaw direction and ±10 degrees in a pitch direction around a current path 50 (that is, the roll axis of the unmanned aircraft 1) indicated by a solid line in FIG. 4. The virtual path setting unit 20 also sets radial virtual paths 52 indicated by broken lines in FIG. 4 by shifting the current path 50 by one degree in the yaw direction and the pitch direction within the range. The range for setting the virtual paths 52 is not limited to ±10 degrees, and may be set to any range.

Here, the plurality of virtual paths 52 are all straight lines. One virtual path 52 forms an angle of one degree with another virtual path 52 in at least one of the yaw direction or the pitch direction. The length of the virtual path 52 equals to a value obtained by the formula: aircraft velocity (m/s)×prescribed time (for instance, five seconds). Here, the virtual paths 52 are straight lines for convenience of explanation. Alternatively, the virtual paths 52 may be represented by curves based on changes in the aircraft attitude or the like. In addition, the angle between the virtual paths 52 is not limited to one degree, and may be set to any angle value.

The instance in which the plurality of virtual paths 52 are set for the unmanned aircraft 1 has been exemplified here. A plurality of other various parameters, such as the aircraft velocity, may be further set, and for instance, a plurality of aircraft velocities may be applied to the plurality of virtual paths 52, respectively.

(Envelope Protection Evaluation Process S202)

The first evaluation unit 22 evaluates the envelope protections on the current path 50 and the plurality of virtual paths 52. Specifically, the first evaluation unit 22 evaluates the envelope protections at the farthermost portions of the current path 50 and the virtual paths 52 (for instance, the aircraft positions five seconds later). The envelope protection refers to a function of automatically controlling an aircraft so that a maneuvering load factor, aircraft attitude, and an aircraft velocity don't exceed allowable ranges of a predetermined flight mode that is set in advance. The maneuvering load factor is a value obtained by dividing an aerodynamic force that an aircraft receives during flight by a load (aircraft weight) during a horizontal steady flight. Here, two instances, that is, stall prevention (aircraft velocity) and crash prevention (aircraft altitude), will be described as the envelope protection.

FIGS. 5A and 5B are explanatory diagrams illustrating evaluations based on the envelope protection. First, the first evaluation unit 22 evaluates the stall prevention using FIG. 5A. Here, an evaluation value of the stall prevention is "0" when the aircraft velocity is less than 100 m/s, gradually increases when the aircraft velocity is between 100 m/s to 150 m/s, then is "1" when the aircraft velocity is between 150 m/s to 300 m/s, and gradually decreases when the aircraft velocity is between 300 m/s to 350 m/s, and is "0" again when the aircraft velocity is 350 m/s or more. Therefore, when the aircraft velocity is maintained between 150 m/s to 300 m/s, the evaluation value of the stall prevention is maintained at "1". When the aircraft velocity is less than 100 m/s, the flight condition might not be maintained. When the aircraft velocity is 350 m/s or more, the aircraft might be damaged.

Next, the first evaluation unit 22 evaluates the crash prevention using FIG. 5B. Here, an evaluation value of the crash prevention gradually increases when the aircraft altitude is between 0 km to 3 km, is "1" when the aircraft altitude is between 3 km to 10 km, then gradually decreases when the aircraft altitude is between 10 km to 11 km, and is "0" when the aircraft altitude is 11 km or more. Therefore, when the aircraft altitude is maintained between 3 km to 10 km, the evaluation value of the crash prevention is maintained at "1".

Subsequently, the first evaluation unit 22 derives a comprehensive evaluation value of the envelope protection based on the evaluation value of the stall prevention and the evaluation value of the crash prevention. For instance, the first evaluation unit 22 compares the evaluation value of the stall prevention with the evaluation value of the crash prevention, and adopts the lower one as the comprehensive evaluation value. In this way, the first evaluation unit 22 more strictly makes an evaluation based on the envelope protection. Therefore, when both the evaluation value of the stall prevention and the evaluation value of the crash prevention are "1", the comprehensive evaluation value is "1", and when one of the evaluation values is less than "1", the comprehensive evaluation value is less than "1".

Here, the instance in which the lower evaluation value of the two evaluation values is adopted as the comprehensive evaluation value is described. Alternatively, an average value of the two evaluation values may also be adopted as the comprehensive evaluation value. Further alternatively, a value obtained by multiplying the two evaluation values may be adopted as the comprehensive evaluation value. In any of these manners, when both the evaluation value of the stall prevention and the evaluation value of the crash prevention are "1", the comprehensive evaluation value is "1", and when one of the evaluation values is less than "1", the comprehensive evaluation value is less than "1".

Here, the two factors, that is, the stall prevention (aircraft velocity) and the crash prevention (aircraft altitude) are used as the envelope protection. It should be noted that examples of the present invention are not limited to these instances. Evaluation may be made based on whether various parameters limited by designs, such as a load on an aircraft, an angular velocity, and a pitch angle, are within prescribed allowable ranges. In this case, the evaluation value is "1" when each parameter is within the allowable range, and is smaller than "1" when each parameter is outside the range.

(Mission Achievement Degree Evaluation Process S204)

The second evaluation unit 24 evaluates the mission achievement degree on each of the current path 50 and the plurality of virtual paths 52. Specifically, the second evaluation unit 24 evaluates the mission achievement degrees at the farthermost portions of the current path 50 and the virtual path 52 (for instance, the aircraft position five seconds later). A mission refers to an object to be achieved at an early stage while ensuring the flight safety of the unmanned aircraft 1, and the mission achievement degree refers to a degree of achievement of such a mission. In this example, the mission achievement degrees are a deviation between the scheduled path 2 and the current path 50 and deviations between the scheduled path 2 and the virtual path 52. Specifically, the deviation is a distance between the scheduled path 2 and the farthermost portion of the current path 50 or the virtual path 52. The farthermost portion is, for instance, the aircraft position five seconds later.

FIG. 6 is an explanatory diagram illustrating an evaluation based on the mission achievement degree. First, the second evaluation unit 24 evaluates the deviation from the scheduled path 2 using FIG. 6. In FIG. 6, an evaluation value of the deviation from the scheduled path 2 is "1" when the deviation from the scheduled path 2 is 0 m, then gradually decreases when the deviation is between 0 m to 5000 m, and is "0" when the deviation is 5000 m or more. Therefore, as the deviation from the scheduled path 2 gets closer to 0 m, the evaluation value of the deviation from the scheduled path 2 is closer to "1".

By evaluating the mission achievement degree, the unmanned aircraft 1 preferentially selects a path whose deviation from the scheduled path 2 is small. Therefore, the same effect as feedback control following the scheduled path 2 is obtained.

In this example, the deviation from the scheduled path 2 is used as the mission achievement degree. It should be noted that examples of the present invention are not limited to this instance. The mission achievement degree may be evaluated based on a deviation between a flight mode set in each scheduled path 2 and an actual flight mode. In this case, the evaluation value of the set flight mode is set to "1", and the evaluation value is set to be smaller than "1" as the deviation from the set flight mode increases.

(Path Determination Process S206)

The path determination unit 26 determines a path among the current path 50 and the plurality of virtual paths 52 based on the evaluation results of the envelope protection and the mission achievement degree.

Here, the path determination unit 26 prioritizes the evaluation value of the envelope protection in order to prioritize safe flight without stall or crash of the unmanned aircraft 1. Specifically, the path determination unit 26 determines a path of which the evaluation result of the envelope protection is best among the current path 50 and the plurality of virtual paths 52. For instance, when the evaluation values of the current path 50 and the plurality of virtual paths 52 are all less than "1", the path determination unit 26 determines a path which has the maximum value.

When the envelope protection is ensured, that is, when evaluation values of a plurality of paths among the current path 50 and the plurality of virtual paths 52 are the maximum value "1" (this is an instance of the phrase that "when the evaluation results of the envelope protection of the plurality of paths are equivalent to each other"), the path determination unit 26 determines a path which has the best evaluation result of the achievement degree. For instance, when the evaluation values of the envelope protection of the plurality of paths are the maximum value "1", the path determination unit 26 preferentially determines a path which has a highest mission achievement degree evaluation, for instance, a path which has a smallest deviation from the scheduled path 2.

(Flight Control Process S208)

The flight controller 28 controls the flight of the unmanned aircraft 1 by feedback control based on the path determined by the path determination unit 26. At this time, the determined path becomes a current path 50 in the next flight control process.

With the configuration described above, predicting the flight in the future after a prescribed time from now, allows for selecting an appropriate path while most preferentially ensuring the safety of the unmanned aircraft 1 based on the envelope protection.

For instance, even when it is difficult for the unmanned aircraft 1 to rapidly rise due to a change in flight environment, the unmanned aircraft 1 revolves around the scheduled path 2 and autonomously rise up while maintaining the aircraft velocity. Even when performing formation flight with other aircrafts, the unmanned aircraft 1 can follow the displacement of the other aircrafts.

A program that causes a computer to function as the flight control system 10 and a computer-readable storage medium storing the program, such as a flexible disc, a magneto-optical disc, a ROM, a CD, a DVD, and a BD, may be provided. Here, the program refers to a data processing unit described in any language or any description method.

The example of the present invention has been described above with reference to the accompanying drawings. It is needless to say that the present invention is not limited to the example. It is obvious that those skilled in the art would conceive various changes and modifications within the scope of claims, and it should be understood that such changes and modifications are included in the technical scope of the present invention.

For instance, in the example described above, the first evaluation unit 22 and the second evaluation unit 24 each makes the evaluation and the path determination unit 26 determines a path based on both evaluation results. It should be noted that the present invention is not limited to this instance. The path determination unit 26 may determine the path only based on one of the evaluation results. For instance, the first evaluation unit 22 may evaluate the envelope protection of each of the plurality of virtual paths 52, and the path determination unit 26 may determine a path among the current path 50 and the plurality of virtual paths 52 based only on the evaluation results of the envelope protection.

In addition, in the example described above, the unmanned aircraft 1 has been exemplified as the aircraft. The present invention is not limited to this instance. The example is applicable to an aircraft in which a pilot is absent.

In the example described above, the virtual path setting unit 20, the first evaluation unit 22, the second evaluation unit 24, the path determination unit 26, and the flight controller 28 which function as the flight control system 10 are all provided in an aircraft (the unmanned aircraft 1). The present invention is not limited to this instance. A part of the functional units may be provided in a device other than the aircraft, for instance, a device located on the ground, and may exchange information by wireless communication with the aircraft.

Each step of the flight control process in this specification is not necessarily processed in chronological order according to the order described in the flowchart, and may include a parallel process or a subroutine process.

Examples of the present invention may be utilized in a flight control system that controls the flight of an aircraft.

The invention claimed is:

1. A flight control system comprising:
   a processor configured to:
      set a plurality of virtual paths other than a current path of an aircraft at a prescribed timing;
      evaluate envelope protection of each of the current path and the plurality of virtual paths by:
         determining a first evaluation value of stall prevention;
         determining a second evaluation value of crash prevention;
         comparing the first evaluation value with the second evaluation value; and
         determining a comprehensive evaluation value based on the first evaluation value and the second evaluation value by assigning a lesser of the first evaluation value and the second evaluation value to be the comprehensive evaluation value;
      determine a path among the current path and the plurality of virtual paths, based on the comprehensive evaluation value of each of the current path and the plurality of virtual paths; and
      control flight of the aircraft based on the determined path.

2. The flight control system according to claim 1, wherein the processor is configured to evaluate a mission achievement degree of each of the current path and the plurality of virtual paths, wherein
   the processor determines the path among the current path and the plurality of virtual paths based on the results of the envelope protection evaluations and the results of the mission achievement degree evaluations.

3. The flight control system according to claim 2, wherein
   the processor determines at least one path of which the result of the envelope protection evaluation has a maximum value among those of the current path and the plurality of virtual paths, and
   when the at least one path comprises a plurality of paths and the results of the envelope protection evaluations of the plurality of paths are equivalent to each other, the processor determines a path of which the result of the mission achievement degree evaluation has a highest value among those of the plurality of paths.

4. A flight control system comprising circuitry configured to:
   set a plurality of virtual paths other than a current path of an aircraft at a prescribed timing;
   evaluate envelope protection of each of the current path and the plurality of virtual paths by:
      determining a first evaluation value of stall prevention;
      determining a second evaluation value of crash prevention;
      comparing the first evaluation value with the second evaluation value; and
      determining a comprehensive evaluation value based on the first evaluation value and the second evaluation value by assigning a lesser of the first evaluation value and the second evaluation value to be the comprehensive evaluation value;
   determine a path among the current path and the plurality of virtual paths, based on the comprehensive evaluation value of each of the current path and the plurality of virtual paths; and
   control flight of the aircraft based on the determined path.

* * * * *